US009333726B2

(12) United States Patent
Hodges

(10) Patent No.: US 9,333,726 B2
(45) Date of Patent: May 10, 2016

(54) COMBINED APPLICATION OF FULL COLOR PATTERNS TO SQUARE PAPER NAPKINS, THAT ONCE FOLDED, CREATE NAPKINS IN 3D COLOR IMAGES RESEMBLING THE ENTITY THE NAPKIN OR ORIGAMI FOLD IS NAMED FOR

(71) Applicant: John C. Hodges, Kalaheo, HI (US)

(72) Inventor: John C. Hodges, Kalaheo, HI (US)

( * ) Notice: Subject to any disclaimer, the term of this patent is extended or adjusted under 35 U.S.C. 154(b) by 0 days.

(21) Appl. No.: 14/015,761

(22) Filed: Aug. 30, 2013

(65) Prior Publication Data

US 2014/0072713 A1  Mar. 13, 2014

Related U.S. Application Data

(60) Provisional application No. 61/697,618, filed on Sep. 6, 2012.

(51) Int. Cl.
| | |
|---|---|
| B32B 9/06 | (2006.01) |
| B31D 1/04 | (2006.01) |
| B31D 5/04 | (2006.01) |
| B05D 3/12 | (2006.01) |
| B05D 5/06 | (2006.01) |
| G09B 19/00 | (2006.01) |
| B32B 1/00 | (2006.01) |
| B32B 29/00 | (2006.01) |
| B31D 5/00 | (2006.01) |

(52) U.S. Cl.
CPC ... *B32B 9/06* (2013.01); *B05D 3/12* (2013.01); *B05D 5/06* (2013.01); *B31D 1/04* (2013.01); *B31D 5/00* (2013.01); *B31D 5/04* (2013.01); *B32B 1/00* (2013.01); *B32B 29/00* (2013.01); *G09B 19/00* (2013.01); *B05D 2203/22* (2013.01)

(58) Field of Classification Search
None
See application file for complete search history.

(56) References Cited

U.S. PATENT DOCUMENTS

| | | | | |
|---|---|---|---|---|
| 2,145,139 | A * | 1/1939 | Scharfenberg | A47G 11/001 2/46 |
| 3,326,365 | A * | 6/1967 | Neureither | A47G 11/001 428/131 |
| 2003/0058258 | A1* | 3/2003 | Simpson et al. | 345/646 |
| 2003/0193488 | A1* | 10/2003 | Bean | 345/204 |
| 2005/0287340 | A1* | 12/2005 | Morelli | B31F 1/07 428/156 |
| 2009/0072483 | A1* | 3/2009 | Salomon et al. | 273/308 |

* cited by examiner

*Primary Examiner* — William Phillip Fletcher, III

(57) ABSTRACT

A method for creating new educational, and theme party products in the form of full color 3D paper napkin entities that resemble the entity that the napkin fold or origami fold is named for. Color patterns are applied to square paper napkins or serviettes which, with the like origami fold, creates a fun challenge to the individual folder to achieve the correct folded outcome. The paper napkins are both functional for everyday use, and are folding fun for seasonal & theme parties, birthdays, and are educational as they stimulate conversation and the creative mind while folding.

6 Claims, 29 Drawing Sheets

US 9,333,726 B2

COMBINED APPLICATION OF FULL COLOR PATTERNS TO SQUARE PAPER NAPKINS, THAT ONCE FOLDED, CREATE NAPKINS IN 3D COLOR IMAGES RESEMBLING THE ENTITY THE NAPKIN OR ORIGAMI FOLD IS NAMED FOR

This application claims the priority of U.S. provisional patent application No. 61/697,618, filed on Sep. 6, 2012.

BACKGROUND OF THE INVENTION

The invention is the method of combining distinctly separate processes to square white paper napkins, that once performed, result in full color 3D paper napkin objects bearing the same name that the napkin is folded into, which creates a new article of manufacture in the paper napkin or serviette industry, for use in the fields of arts and education, along with catering & restaurants, seasonal parties, theme parties, birthday parties, origami folding challenges, and overall general daily paper napkin use.

BRIEF SUMMARY OF THE INVENTION

The first distinct process in turning a white paper napkin into the full color 3D image bearing the same name that the napkin is folded into is the creation of a specifically arranged named color print design pattern, artistic rendering, or computer or photographic image, to match the named fold, and applying that color pattern onto square paper napkins. The secondary process is then applying the named pattern fold to like named pattern to create the full color 3D object. These patterns may appear to be an abstract image when not folded, yet will prove to be the specific design or configured pattern needed to create this new original article of manufacturing once the process of folding is applied. The design patterns are specific to each entity's fold name, and may not be interchanged.

BRIEF DESCRIPTION OF DRAWINGS

FIG. 3Be is an elevational view of the colored 3D paper napkin structure that resembles an actual recognizable sea shell, created by applying the color pattern shown in FIG. 3A to the square paper napkin and folding the napkin using the known "Sea Shell" origami or napkin fold illustrated in FIGS. 3Ba, 3Bb, 3Bc, 3Bd, and 3Be.

FIG. 5Bb is an elevational view of the final colored 3D paper napkin object that resembles an actual pineapple, created by applying the color pattern shown in FIG. 5A to the square paper napkin and folding the napkin using the known "Pineapple" origami or napkin fold illustrated in FIGS. 5Ba and 5Bb.

FIG. 6Bb is an elevational view of the same paper napkin in FIG. 6A once the well-known "Pineapple" origami or napkin fold is completed, consisting of a final colored 3D paper napkin object that resembles an actual pineapple.

DETAILED DESCRIPTION OF THE INVENTION

The presently preferred best modes for carrying out the invention are illustrated by way of example in the figures.

Figure 1A:
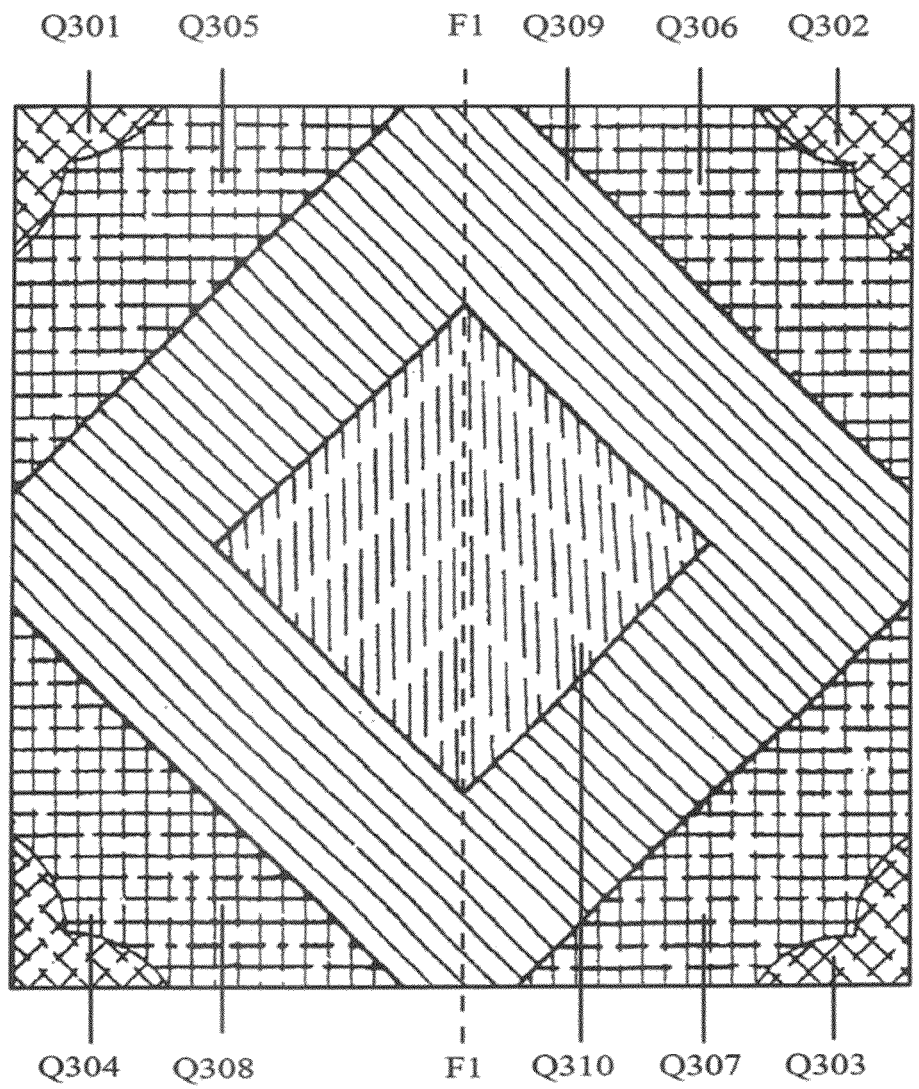
FIG. 1A consists of the top view of an open flat square paper napkin of conventional 1 ply, 2 ply, or 3 ply paper thickness, with a specific color pattern called the "Bird of Paradise Flower Design" printed or otherwise applied onto it, which coincides with the design in U.S. design Pat. No. Des. 327,776 for "Napkin Pattern" issued on Jul. 14, 1992, incorporated herein by reference.
Figure 1B:
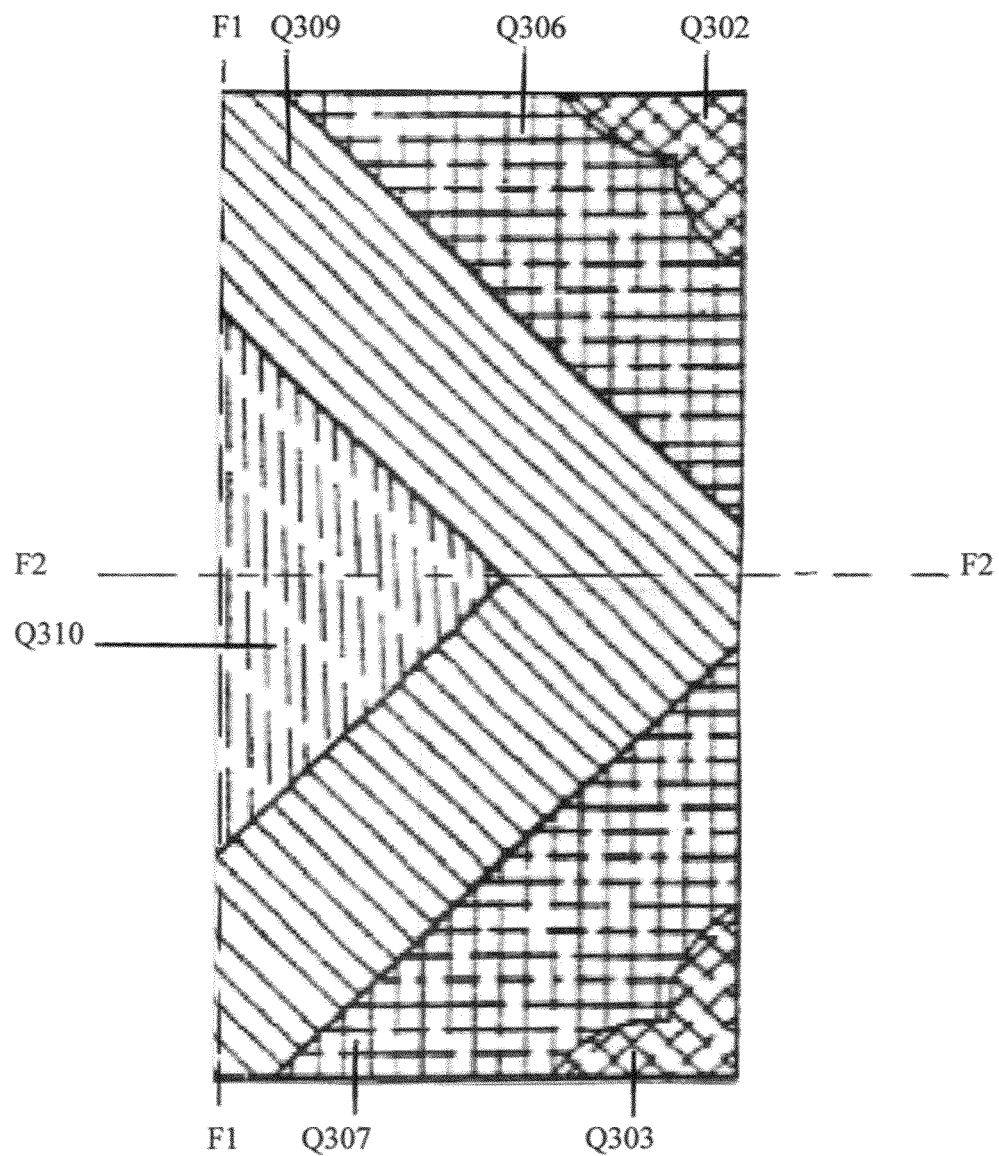
FIGS. 1Ba, 1Bb, 1Bc, 1Bd, and 1Be illustrate the folding steps of the known "Bird of Paradise" origami or napkin fold used to attain FIG. 1C.
Figure 1B:
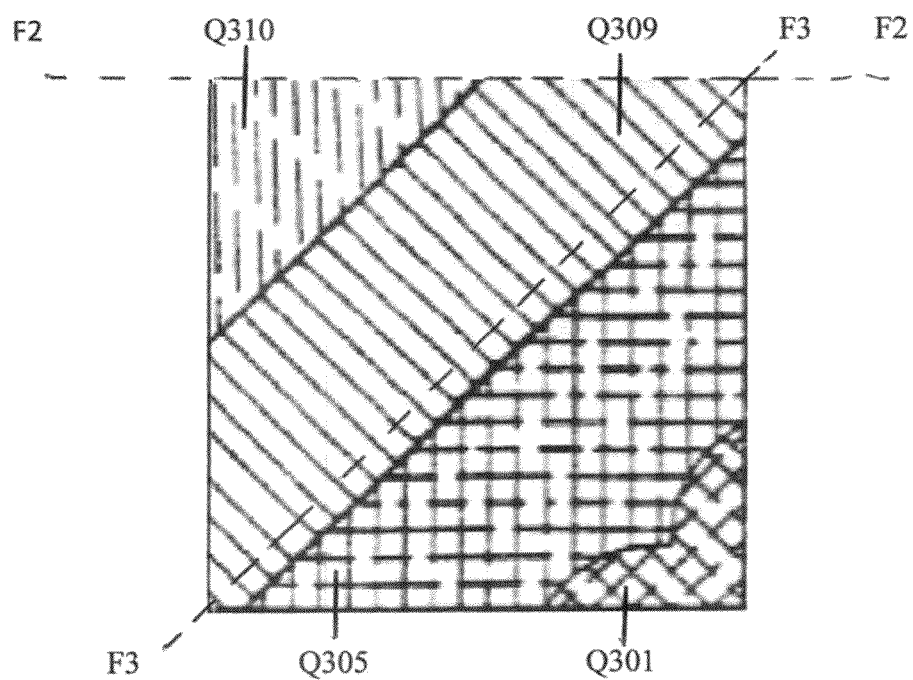
Figure 1B:
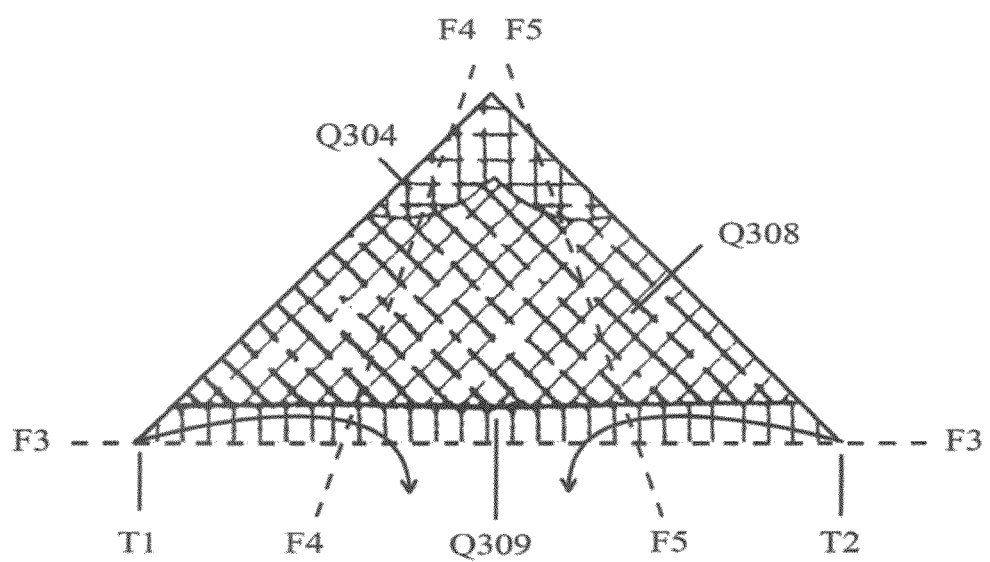
Figure 1B:
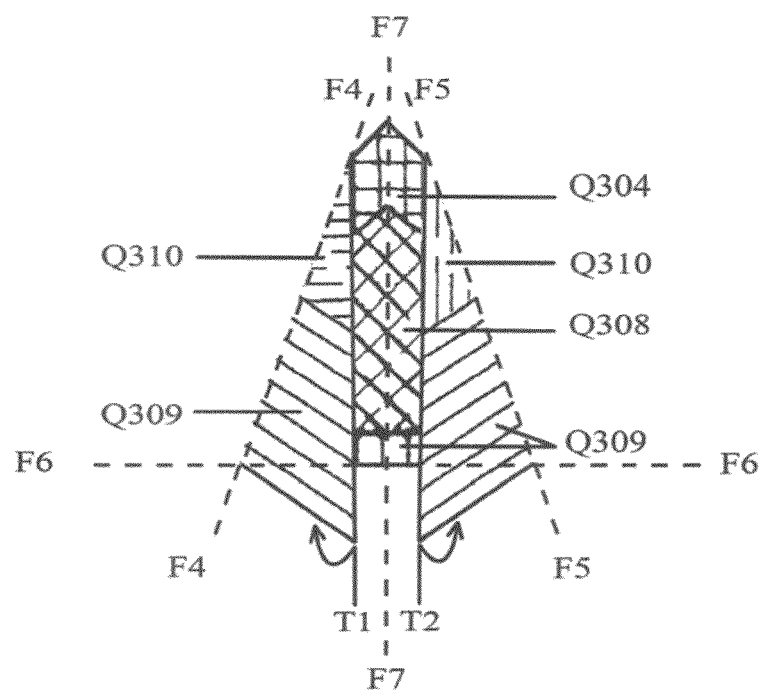
Figure 1B:
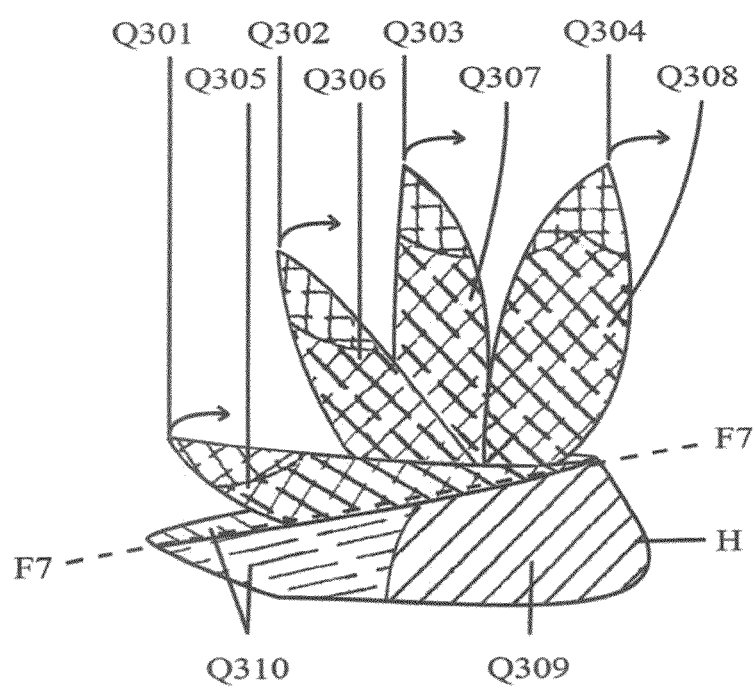
Figure 1C:
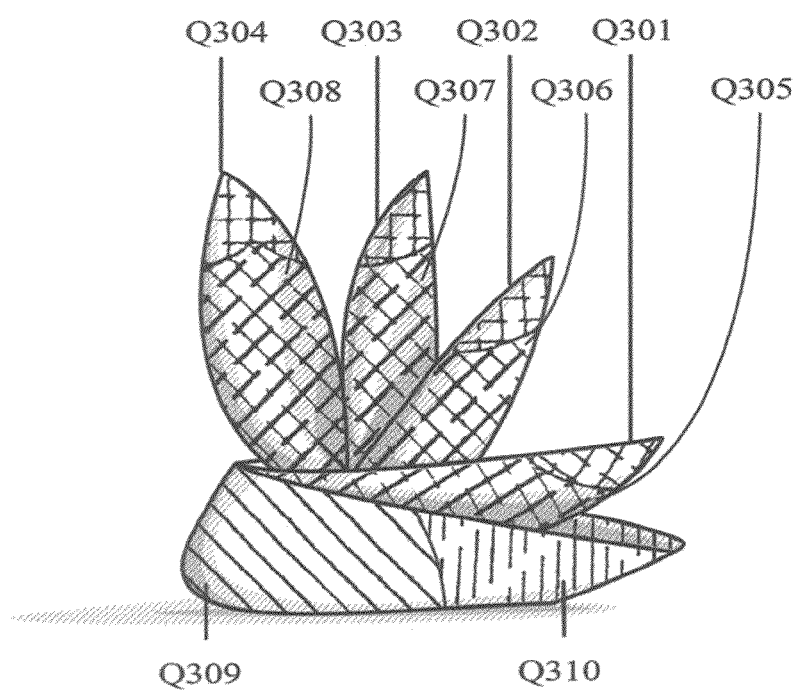
FIG. 1C is an elevational view of the final colored 3D paper napkin object that resembles an actual bird of paradise flower, created by applying the color pattern shown in FIG. 1A to the square paper napkin and folding the napkin using the known "Bird of Paradise" origami fold or napkin fold illustrated in FIGS. 1Ba, 1Bb, 1Bc, 1Bd, and 1Be.

Referring to FIG. 1C shown is a presently preferred embodiment of the invention that begins with the application of the color pattern called, the "Bird of Paradise Flower Design," shown in FIG. 1A, to a napkin, preferably a square white paper napkin of conventional 1 ply, 2 ply, or 3 ply paper napkin thickness.

Referring to FIG. 1A shown is the "Bird of Paradise Flower Design", which preferably contains a collaboration and combination of 10 different color pattern sections or quadrants, Q301, Q302 Q303, Q304, Q305, Q306, Q307, Q308, Q309, Q310. The "Bird of Paradise Flower Design" is preferably printed or otherwise applied in some manner onto one side of the napkin. Quadrants Q301, Q302, Q303, and Q304 represent the colored petals of the bird of paradise flower. In this particular example, orange is preferably applied to Q301, Q302, Q303, and Q304. Q310 is preferably colored purple and appears near the end tip of the body portion of the flower. Q305, Q306, Q307, and Q308 are preferably colored yellow and are part of the flowers growing tip petals. Q309 represent the green body quadrant of the flowers body. F1 designates the first fold line.

FIG. 1Ba illustrates the result of the first folding step of the well-known "Bird of Paradise Fold" wherein the napkin in FIG. 1A is folded in half along the line F1 shown in FIG. 1A. In FIG. 1Ba, Quadrants Q302, Q303, Q306, Q307, and half of quadrants Q309, and Q310 appearing on one side of the napkin facing up, with Q301, Q304, Q305, Q308, and half of quadrants Q309, and Q310 appearing on the other side of the napkin facing back (not shown). F2 designates the second fold line.

FIG. 1Bb illustrates the result of the second folding step wherein the napkin in FIG. 1Ba is folded along the line F2 so that Q302 and Q306 are folded down on top of and facing Q303 and Q307. Quadrant Q301 is now viewable along with portions of Q305, Q309, and Q310. F3 is the third fold line.

FIG. 1Bc illustrates the result of the third folding step wherein the napkin 1Bb is folded along the line F3 into a triangle shape by folding Q301 and Q305 up onto and face to face with Q309 and Q310. In this step all petal quadrants are now stacked on top of the body quadrants, Q304 and Q308 now viewable on top facing up, with a small amount of Q309 exposed along one length of the triangle. F4 and F5 represent the next fold steps starting at both corners T1 and T2 of-which display folding directional arrows.

FIG. 1Bd illustrates the result of the next folding steps to wherein the napkin in FIG. 1Bc is folded along the lines F4 and F5, following the directional arrows at T1, and T2 found in FIG. 1Bc. Specifically, holding down the tip of Q304 with a finger, corner T1 is folded along the line F4 in an inward and downwardly manner, and tip T2 is folded along the line F5 in an inward and downwardly manner, so that approximately a ½ inch space separates the T1 and T2. Crease F4 and F5 leaving the tips T1 and T2 pointing away from the quadrant Q304 with the result being the napkin shown in FIG. 1Bd. FIG. 1Bd also shows portions of Q304, Q308, and Q309 now located on the inside off body quadrants Q309, and Q310. F6 is the next fold line, followed by fold line F7 forming the body portion of the flower paper napkin.

FIG. 1Be illustrates the result of the final folding steps wherein T1 & T2 in FIG. 1Bd are folded under and behind Q309 along the line F6 so T1 and T2 are no longer visible from the front, and only visible from the back of the napkin (not shown). The napkin is then folded in half along the line F7 in FIG. 1Bd, in such a manner that T1, and T2 on the back of the napkin (not shown) are folded toward, and facing of each other inside the fold. Hold the fold together at Reference H as shown in FIG. 1Be, and gently crease the length of the napkin at F7. Next the napkin should be held at H (pressing T1 and T2 together). All 4 petals (quadrants Q301 & Q305, Q302 & Q306, Q303 & Q307, and Q304 & Q308) should be gently lifted up and separated from Q309 and Q310 (together being the body of the flower) then each individual petal quadrant pulled back towards and above H. Each petal should be separate in sequence starting with Q304 & Q308, until all 4 petals are brought up out of the body of the flower. Pinch or crease each petal quadrant to expose the color pattern on the outside, folding any non-printed white portion from reverse side of napkin, inside of colored petal. The final folding results should show the four yellow based orange tipped petals Q305 & Q301, Q306 & Q302, Q307 & Q303, and Q308 & Q304, rising out of Q309 and Q310 the green and purple hue in the body portion of the flower shown in FIG. 1Be.

FIG. 1C is the mirror image of FIG. 1Be and illustrates another example of the final colored 3D paper napkin structure that resembles an actual recognizable bird of paradise flower.

Figure 2A:
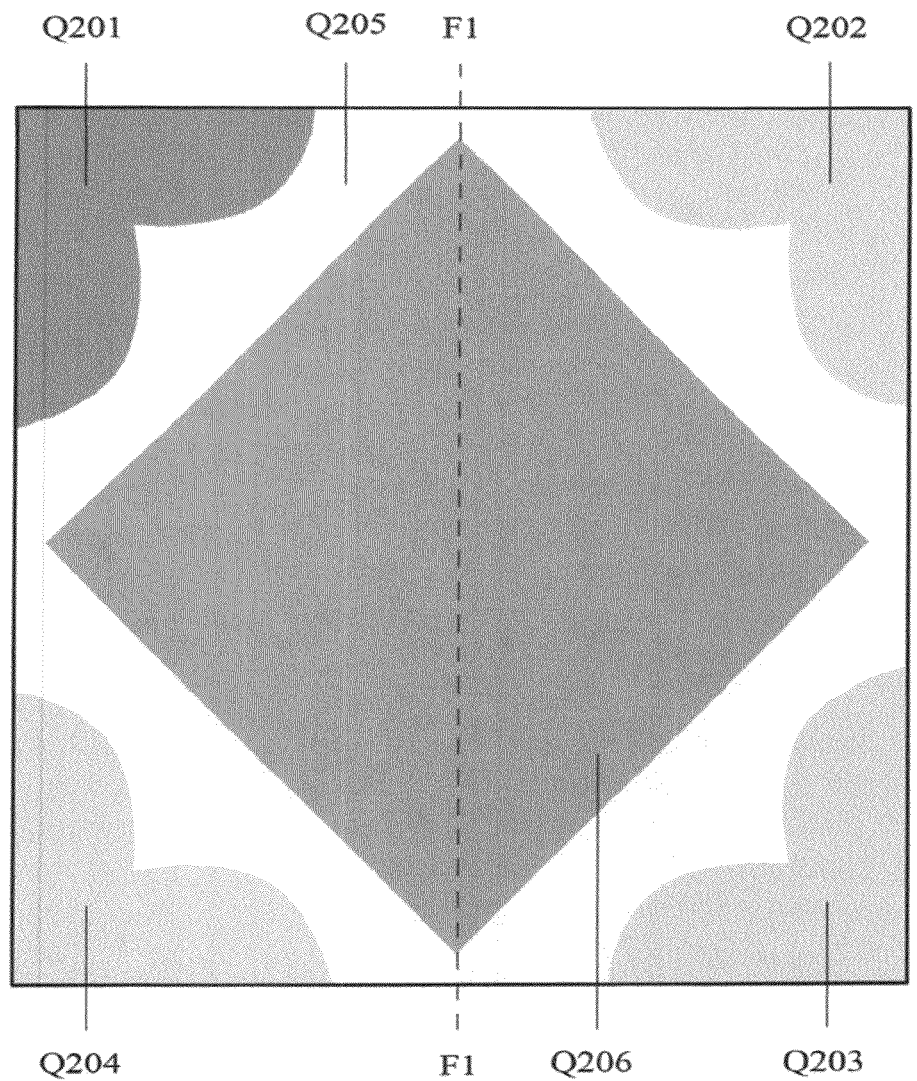
FIG. 2A consists of a top view of an open flat square paper napkin of conventional 1 ply, 2 ply, or 3 ply paper thickness with a specific color pattern called the "Bird of Paradise Flower 2 Design" printed or otherwise applied onto it, which is a modification or variation of the design in U.S. design Pat. No. Des. 327,776 for "Napkin Pattern" issued on Jul. 14, 1992, incorporated herein by reference.
Figure 2B:
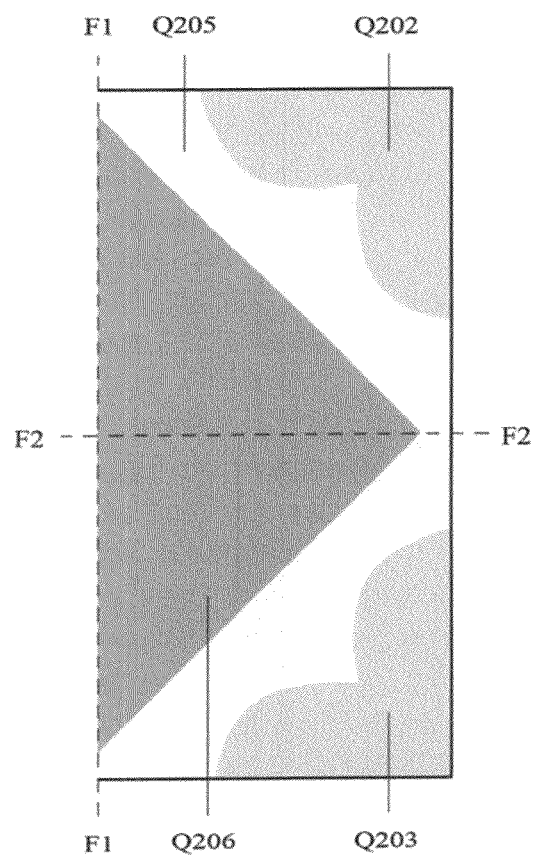
FIGS. 2Ba, 2Bb, 2Bc, 2Bd, and 2Be illustrate the folding steps of a well-known origami or napkin fold called the "Bird of Paradise" origami or napkin fold.
Figure 2B:
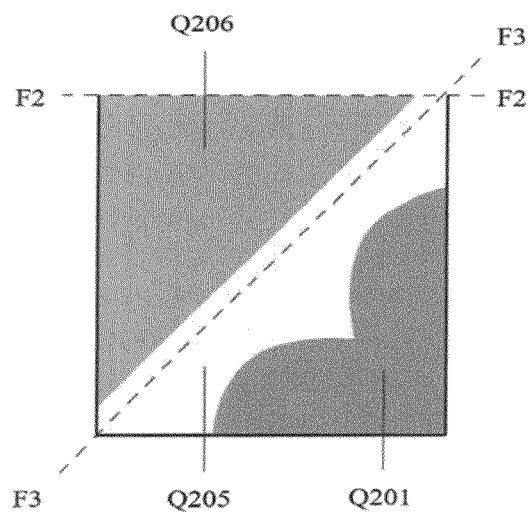
Figure 2B:
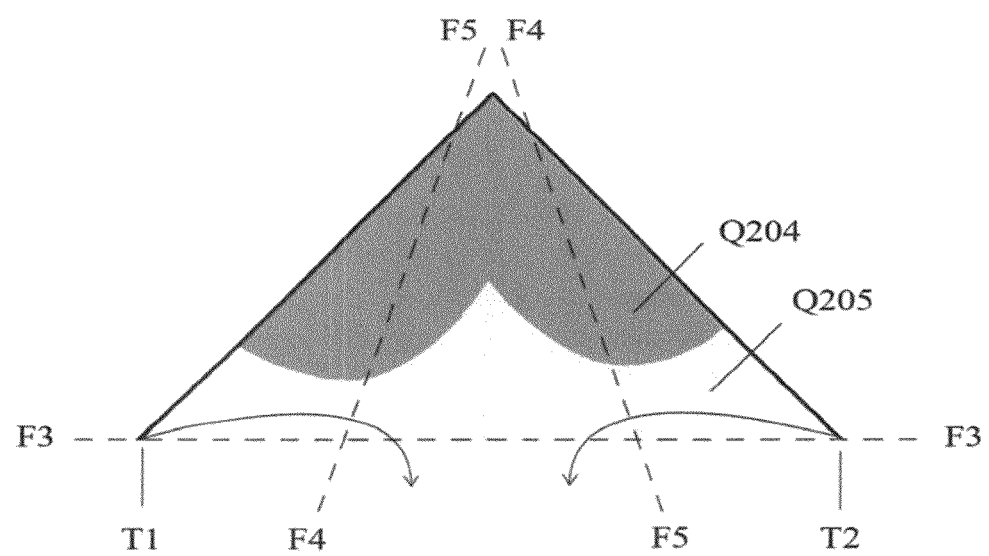
Figure 2B:
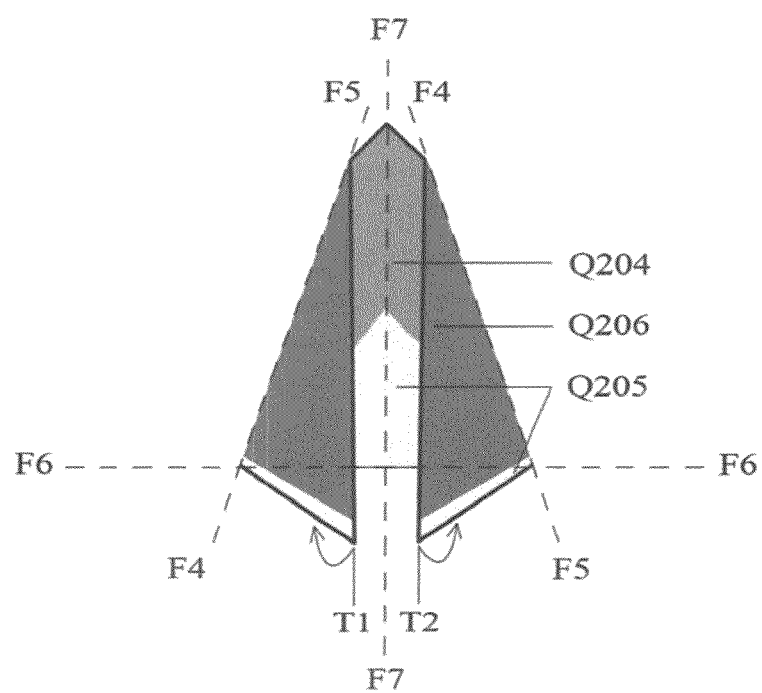
Figure 2B:
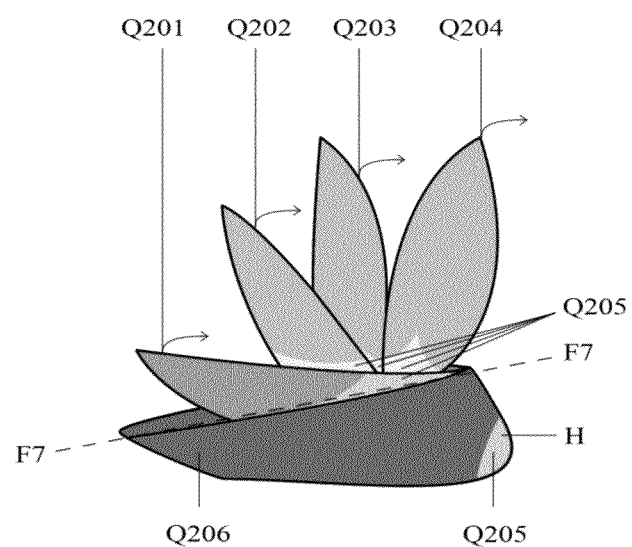
Figure 2C:
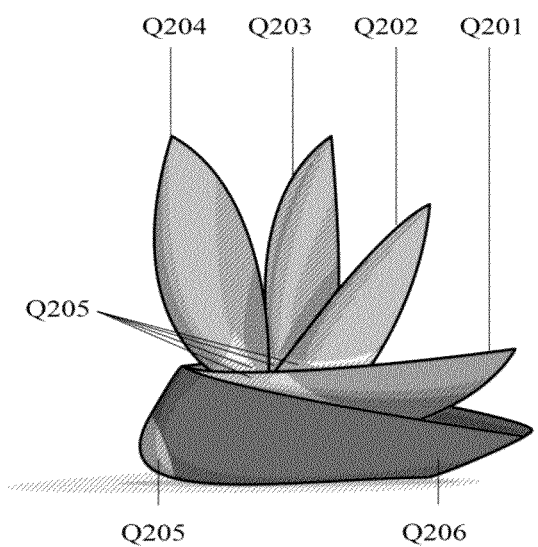
FIG. 2C is an elevational view of the final colored 3D paper napkin object that resembles an actual bird of paradise flower, created by applying the color pattern shown in FIG. 2A to the square paper napkin and folding the napkin using the known "Bird of Paradise" origami fold or napkin fold illustrated in FIGS. 2Ba, 2Bb, 2Bc, 2Bd, and 2Be.

Referring to FIG. 2C shown is another presently preferred embodiment of the invention that begins with the application of the color pattern called, the "Bird of Paradise Flower Design 1," shown in FIG. 2A, to a napkin, preferably a square white paper napkin of conventional 1 ply, 2 ply, or 3 ply paper napkin thickness.

Referring to FIG. 2A, shown is the "Bird of Paradise Flower 2 Design" which preferably has 6 different color pattern sections or quadrants, specifically Q201, Q202 Q203, Q204, Q205, and Q206. The "Bird of Paradise Flower 2 Design" is preferably printed or otherwise applied in some manner onto one side of the napkin. Quadrants Q201, Q202, Q203, and Q204 represent the petals of the bird of paradise flower. The petals are preferably the same color, usually orange, but one will be purple in hue. In this particular example, orange is preferably applied to Q202, Q203, and Q204, with purple being applied to Q201. Q205 is preferably colored yellow-green and represents the flower's growing tip petals. Q206 is preferably colored green and represents the body of the flower. F1 designates the first fold line.

FIG. 2Ba illustrates the result of the first folding step of the well-known "Bird of Paradise" origami or napkin fold wherein the napkin in FIG. 2A is folded in half along the line F1, with Q202, Q203, and portions of Q205, and Q206 appearing on one side of the napkin facing up, and Q201, Q204, and portions of Q205 and Q206 appearing on the other side of the napkin facing back (not shown). F2 designates the second fold line.

FIG. 2Bb illustrates the result of the second folding step of the well-known "Bird of Paradise" origami or napkin fold wherein the napkin in FIG. 2Ba is folded along the line F2 so that Q202 is folded down on top of and facing Q203. Quadrant Q201 (the purple petal) is now viewable along with portions of Q205 and Q206. F3 is the third fold line.

FIG. 2Bc illustrates the result of the third folding step of the well-known "Bird of Paradise" origami or napkin fold wherein the napkin 2Bb is folded along the line F3 into a triangle shape by folding Q201 up toward and onto Q206. In this step all petal quadrants are now stacked on top of the body quadrants, with portions of Q205 and Q204 now facing up and viewable. F4 and F5 in FIG. 2Bc represent the next fold steps starting at both corners T1 and T2.

FIG. 2Bd illustrates the result of the next folding steps of the well-known "Bird of Paradise" origami or napkin fold wherein the napkin in FIG. 2Bc is folded along the lines F4 and F5. Specifically, holding down the tip of Q204 with a finger, tip T1 is folded along the line F4 in an inward and downwardly manner, and tip T2 is folded along the line F5 in an inward and downwardly manner, so that approximately a ½ inch space separates the T1 and T2. Crease F4 and F5 leaving the tips T1 and T2 pointing away from the quadrant Q204 with the result being the napkin shown in FIG. 2Bd. F6 is the next fold line, followed by fold line F7 forming the body portion of the flower napkin.

FIG. 2Be illustrates the result of the next folding steps of the well-known "Bird of Paradise" origami or napkin fold wherein T1 & T2 in FIG. 2Bd are folded under and behind Q205 along the line F6 so T1 and T2 are no longer visible from the front, and only visible from the back of the napkin (not shown). The napkin is then folded in half along the line F7 in FIG. 2Bd in such a manner that T1 and T2 on the back of the napkin (not shown) are folded toward and facing of each other inside the fold and gently crease the length of the napkin at F7.

Thereafter, referring to FIG. 2Be, the napkin should be held at H (pressing T1 and T2 together). All 4 petals (quadrants Q201 thru Q204) should be gently lifted up and separated from Q206 and Q205 (together being the body of the flower) then each individually pulled back towards and above H. Each petal should be separated in sequence starting with Q204, until all 4 petal quadrants are brought up out of the body of the flower. Pinch or crease each petal quadrant to expose the color pattern on the outside, folding any non-printed white portion from reverse side of napkin, inside of colored petal. The final folding results should show the three orange petals Q202, Q203, and Q204 and one purple petal Q201 rising out of Q206 and Q205 shown in FIG. 2Be.

FIG. 2C is the mirror image of FIG. 2Be and illustrates another example of the final colored 3D paper napkin structure that resembles an actual recognizable bird of paradise flower.

Figure 3A:
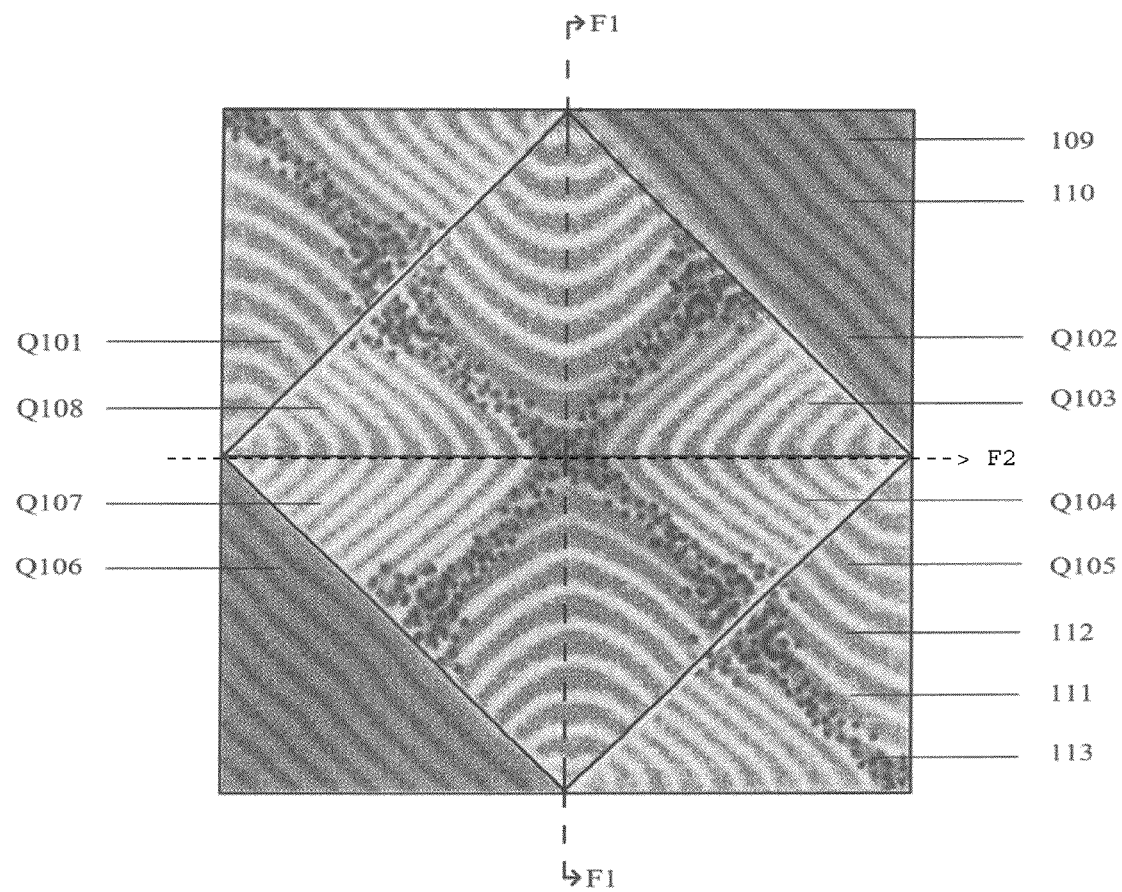
FIG. 3A described as the top view of an open flat square paper napkin of conventional 1 ply, 2 ply, or 3 ply paper thickness with a specific color pattern called the "Sea Shell Design" printed or otherwise applied onto it, which coincides with the design in U.S. design Pat. No. D484,316 S for "Surface Pattern For a Napkin Providing the Illusion of A Three-Dimensional Shell" issued Dec. 30, 2003, incorporated herein by reference.
Figure 3B:
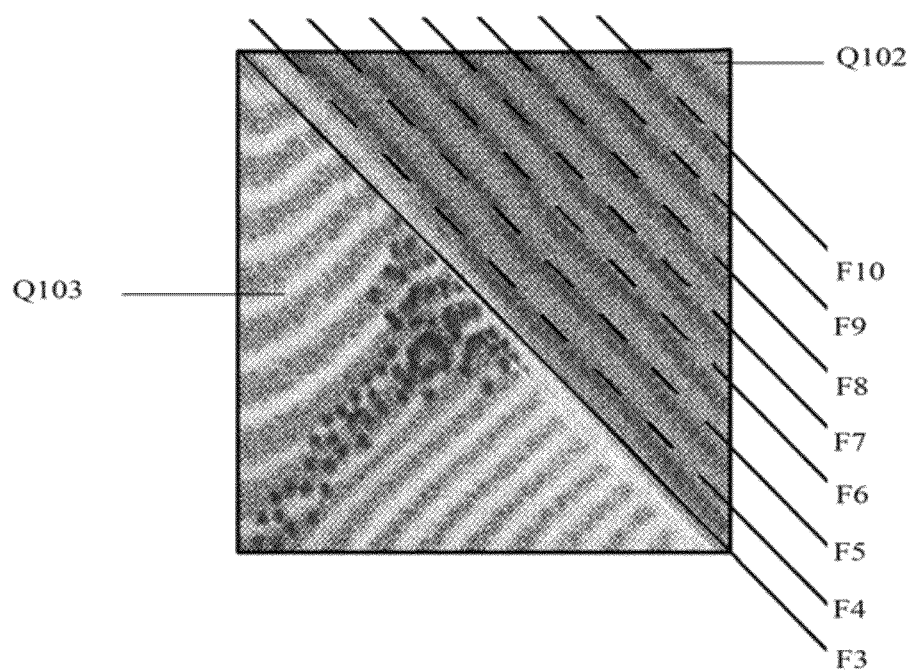
FIGS. 3Ba, 3Bb, 3Bc, 3Bd, and 3Be illustrate a well-known origami or napkin fold called the "Sea Shell" origami or napkin fold.
Figure 3B:
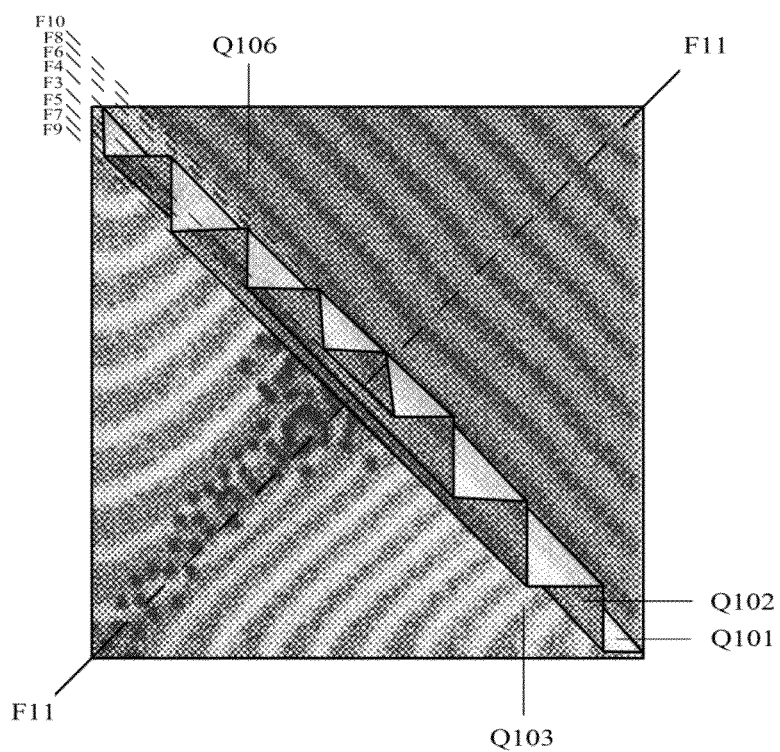
Figure 3B:
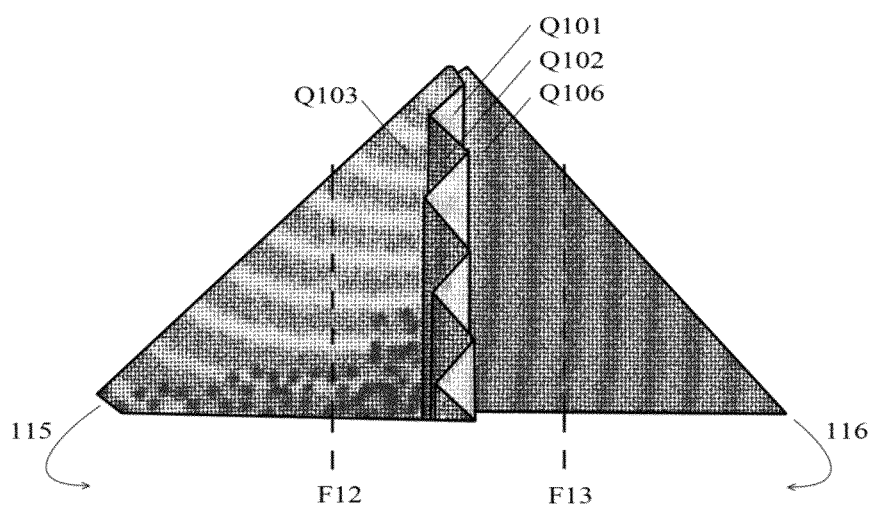
Figure 3B:
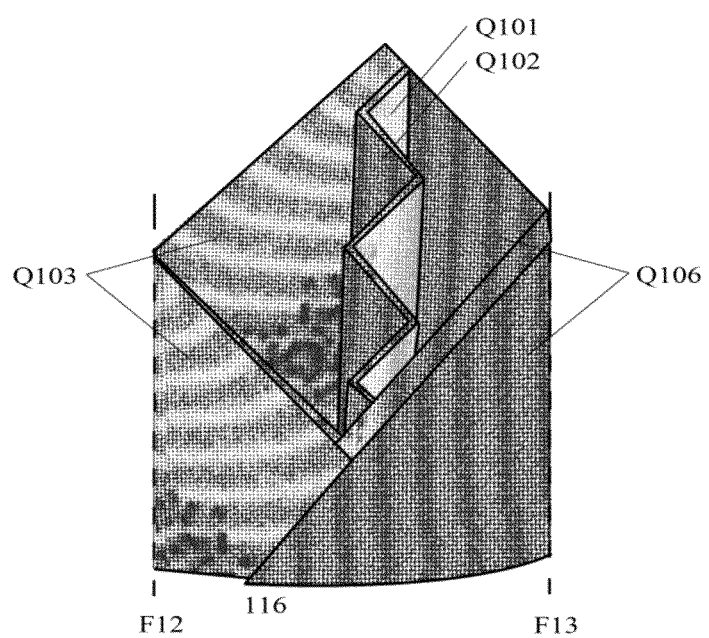
Figure 3B:
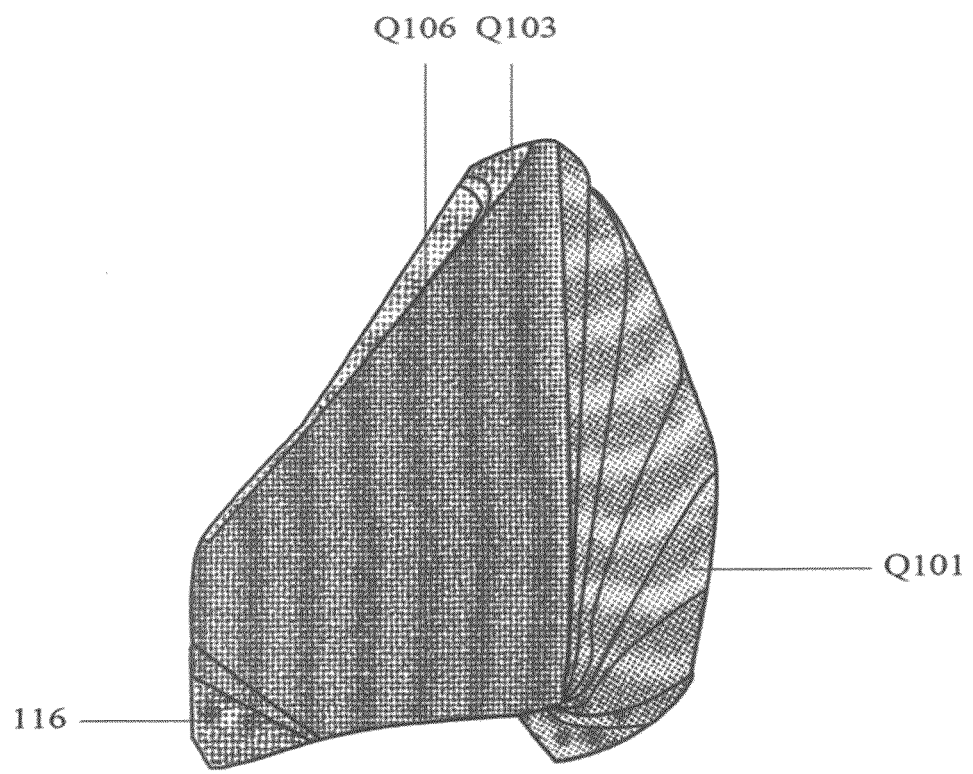
Figure 3C:
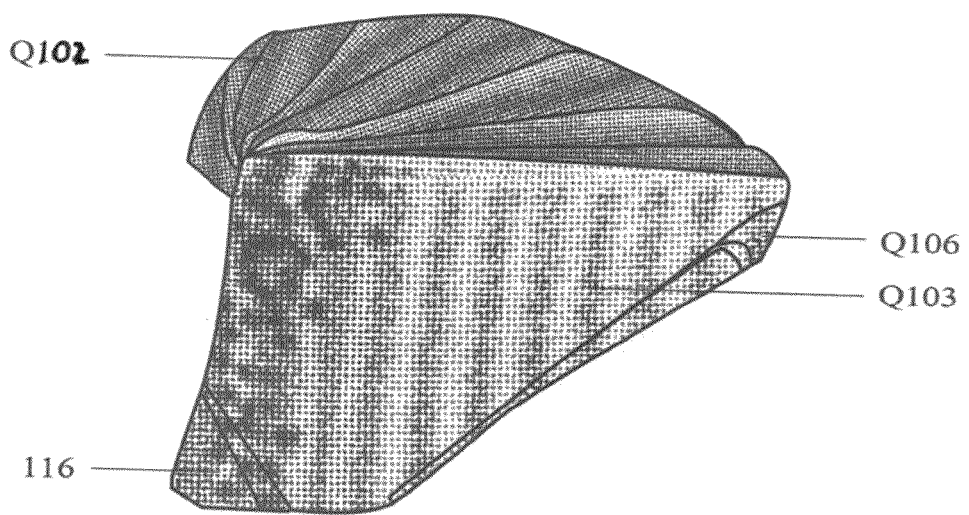
FIG. 3C is a perspective view of the colored 3D paper napkin structure that resembles an actual recognizable sea shell, as shown in FIG. 3Be.

Referring to FIG. 3C, shown is another presently preferred embodiment of the invention that begins with the application of the "Sea Shell Design" shown in FIG. 3A to a napkin, preferably a square white paper napkin of conventional 1 ply, 2 ply, or 3 ply thickness.

Referring to FIG. 3A, the "Sea Shell Design" preferably has 8 different color pattern sections or quadrants, specifically Q101, Q102 Q103, Q104, Q105, Q106, Q107, and Q108. These color patterns are preferably printed or otherwise applied in some manner onto one side of the paper napkin. Q102 and Q106 preferably are of similar color & pattern in design, both containing reference 110, which are a series of darker yellow tone lines, and reference 109 which are lighter yellow tone lines. Q102 represents the "fin" portion of the shell sea structure as shown in FIG. 3C. Q101, Q103, Q104, Q105, Q107, and Q108 represent the light sand color and dark brown color body of the sea shell, and contain reference numbers 111, 112, and 113. Reference 111 represent the lighter toned body lines, 112 represents the darker tone body lines, and 113 represents the darker tone camouflaging spots and specks placed on top of 111 and 112. F1 represents the first folding line. F2 represents the second fold line.

FIG. 3Ba illustrates the result of the first folding steps of the well-known "Sea Shell" origami or napkin fold, wherein the napkin in FIG. 3A is folded in half along the line F1 (shown in FIG. 3A) so that Q102, Q103, Q104, and Q105 appear on one side of the napkin facing front (not shown), and Q101, Q106, Q107 and Q108 appearing on the other side of the napkin facing back (not shown). The napkin is then folded in half again at fold line F2 (shown in FIG. 3A), so that it is quartered (as shown in FIG. 3Ba) with Q102 and Q103 facing the front, and Q104 and Q105 facing the back (not shown). References F3-F10 in FIG. 3Ba are the fold lines referred to as an accordion fold sequence used to attain FIG. 3Bb.

FIG. 3Bb illustrates the result of the accordion fold sequence (folding steps F3-F10), wherein the triangular quadrant Q102 is positioned on top of Q101 and are lifted up together to center fold line F3, exposing Q106, and the accordion style fold consisting of creasing about ½ inch width of the napkin at each fold line, F3, F4, F5, F6, F7, F8, F9, and F10, is performed placing each fold down onto the previous fold in sequence on top of the body quadrants Q103 and Q106, with the accordion folds stacked on top running down in the center of Q103 and Q106 as seen in FIG. 3Bb. Press or re-crease all fold lines in accordion section. F11 represents the next fold line to attain FIG. 3Bc.

Referring to FIG. 3Bc, holding the accordion fold portion at its center as shown in FIG. 3Bb, turn the napkin over on its back and fold the napkin in half triangularly following fold line F11 keeping the accordion fold portion on outside running up the center of napkin now folded in a triangle shape as shown in FIG. 3Bc.

FIG. 3Bc illustrates the result of the folds in FIG. 3Bb, wherein then napkin in 3Bb is folded into a triangular shape, at F11 shown in FIG. 3Bb, with both sides of the triangle now containing and displaying views of half of Q103 and Q106 quadrants, along with half of Q101 and Q102 quadrants as seen in FIG. 3Bc. Q103 and Q106 flank the visually intermittent patterns of Q101 and Q102, that appear in their respective quadrants with-in the accordion folds. Accordion folds Q101 and Q102 wrap around the outside of the folded triangle, appearing on both sides running up the middle of the triangle. F12 and F13 are the next fold lines to inter-join corner references 115 to 116 of-which hold the fold together at 116, as shown in FIG. 3Bd. Folds F12, and F13 in FIG. 3Bc illustrate how to wrap the tip of Q103, reference 115, around and insert it about 1 inch into the folded gap created between Q106 and Q105, reference 116, then press or crease on the intersection at 116 as seen in FIG. 3Bd.

FIG. 3Bd is the result of folds F12 and F13, and pinching or creasing the intersection 116 together of which in this view is located at the back of Shell body on the bottom edge of the shell. By rotating FIG. 3Bd about 90 degrees to the left horizontally creates FIG. 3Be.

FIG. 3Be illustrates a side view of a colorized 3D paper napkin object, that resembles an actual sea shell as found in nature, sitting upright, or standing up on its end, with its fins Q101 facing outward to the side, with the dark and light brown striped and specked camouflaged body Q106 facing out, and Q103 on backside facing opposite of view angle.

FIG. 3C illustrates a 180 view of the same colorized 3D paper napkin object in FIG. 3Be sitting or laying on its back or side with its fins Q102 facing upwards, with Q103 facing out, and Q106 on back side of view, replicating the view of an actual recognizable colored sea shell.

Figure 4A:
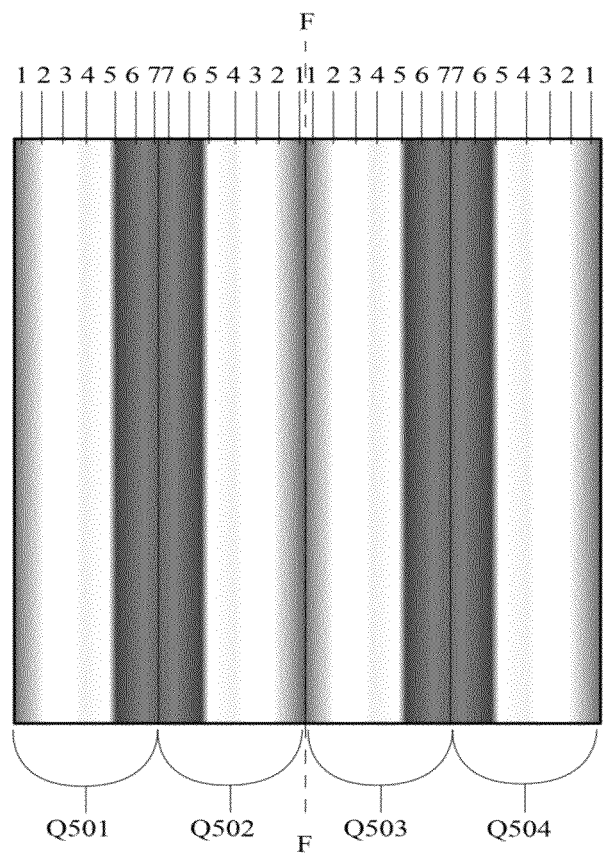
FIG. 4A consists of the top view of an open flat square paper napkin of conventional 1 ply, 2 ply, or 3 ply paper thickness with a specific color pattern called the "Rainbow Design" printed or otherwise applied onto it, which coincides with the same design in U.S. design Pat. No. D484,318 S for "Surface Pattern for a Napkin Providing the Illusion of a Three-Dimensional Arc Rainbow" issued Dec. 30, 2003, incorporated herein by reference.
Figure 4C:
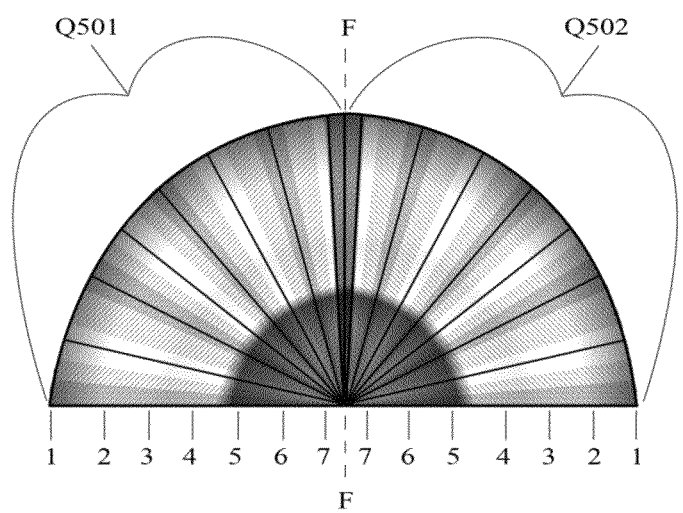
FIG. 4C illustrates a front elevational view of the final colored 3D paper napkin object that resembles an actual rainbow, created by applying the color pattern shown in FIG. 4A to the square paper napkin and folding the napkin using the well-known origami or napkin fold called the "Rainbow" or "Fan" origami or napkin fold (described below).

Referring to FIG. 4C shown is another presently preferred embodiment of the invention that begins with the application of the color pattern called the "Rainbow Design," shown in FIG. 4A, to a napkin, preferably a square white paper napkin of conventional 1 ply, 2 ply, or 3 ply paper napkin thickness.

FIG. 4C illustrates the final outcome of applying the following well-known "Rainbow" or "Fan" origami or napkin fold to the napkin in FIG. 4A.

Referring to FIG. 4A, the design preferably has 4 different color pattern sections or quadrants, specifically Q501, Q502 Q503, and Q504, and these color patterns are preferably printed or otherwise applied in some manner onto one side of the paper napkin. Quadrants Q501, and Q503 preferably consist of the same identical colors and pattern sequence, as referred to by the following references: 1=red, 2=orange, 3=yellow, 4=green, 5=blue, 6=indigo, and 7=violet. Q502 and Q504 preferably consist of the same identical colors and pattern sequence, yet in the exact reverse color sequence order from Q501 and Q503, specifically, references: 7=violet, 6=indigo, 5=blue, 4=green 3=yellow, 2=orange, and 1=red. Q501 and Q502 are preferably specifically aligned and strategically placed next to each other with color patterns running vertical to each other, in a mirroring pattern to each other, on the left half of the open napkin, and Q503 and Q504 are also preferably specifically aligned and strategically placed next to each other with color patterns running vertical to each other, in mirroring pattern to each other, on the right half of the open napkin, the edges of the two center quadrants Q502, reference 1, and Q503, reference 1 meet or connect in the middle of the design pattern, creating the completed pattern FIG. 4A, whereas visually the left half of the napkin pattern Q501 and Q502, mirrors the identical right half of napkin pattern Q503 and Q504. F is the first fold line.

The folding steps of the well-known "Rainbow" or "Fan" origami or napkin fold are generally as follows: 1. Fold napkin in ½ with colors running length of fold. →2. Start at one end and fold the napkin in ½ to ¾ inch strips stacking them upon each other like an accordion, and fold until you have about 2.5-3 inch left unfolded. →3. Fold napkin in ½ with unfolded flat side inside, accordion fold side on outside and press accordion ends together. →4. While holding firmly, take unfolded corner on remaining napkin, and tuck it down triangularly into the creased center of the fans accordion fold locking the accordion sides together. →5. Set it upright with accordion ends up, and release the fan, and a rainbow appears.

More specifically, the well-known "Rainbow" or "Fan" origami or napkin fold can be described as: referring to FIG. 4A, Fold napkin in half along line F with colors running vertically the length of fold, with Q503 and Q504 on top facing front, and with Q501 and Q502 facing the back. Start at one end and fold the napkin in ½ to ¾ inch widths, folding them up into each other like an accordion into the previous fold in sequence, up on top of the flat unfolded napkin portion until you have about 2.5-3 inches left. Fold the napkin in half with unfolded flat side of Q501 and Q502 facing each other inside, and with accordion fold Q503 and Q504 facing on the outside of fold, press accordion folds at center fold together. While holding firmly, take the 2.5-3 inches of the unfolded portion at the top corners on remaining napkin Q503, and Q504, and tuck or fold Q503 with Q504 down together triangularly into the fold gap in the accordion side of Q504, facing back onto Q504 locking the two quadrants together at the center of the fold line F. Re-crease all folds. Turn the locking fold side to the back side of the folded paper napkin, set the napkin upright on the accordion folded end, and release the napkin to allow the accordion folds to fan out, and a view of a colored rainbow structure is displayed, that visually shows and includes the colors of the rainbow, references 1-7 and references 7-1, with-in perspective quadrants Q501, and Q502, as it appears in FIG. 4C.

FIG. 4C illustrates and displays the front view of a colorized rainbow paper napkin structure, that started as a 2 dimensional (2D) white paper napkin, that had the "Rainbow Design" applied onto one side of its surface and folded using the known "Rainbow" origami or napkin fold.

Figure 5A:
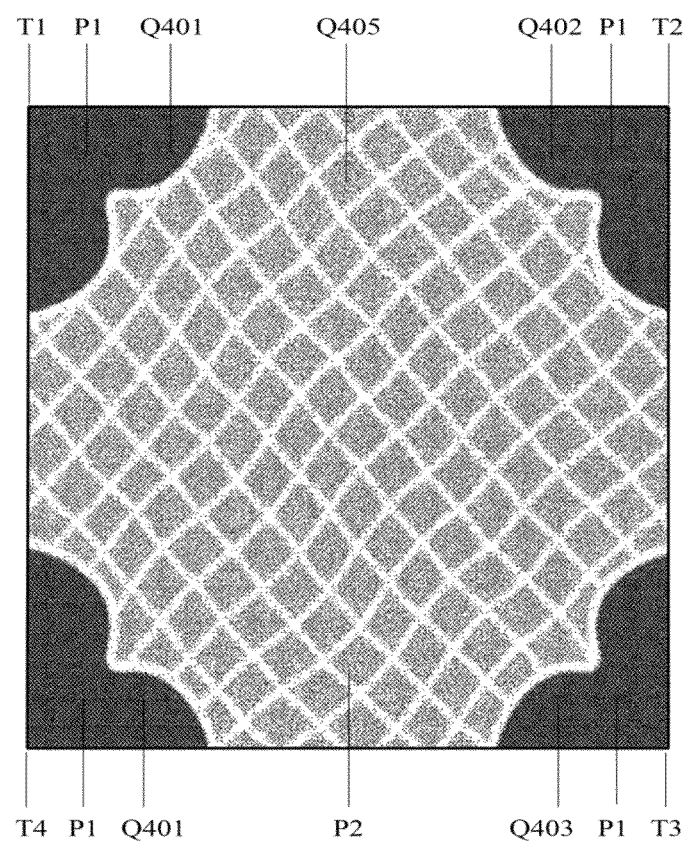
FIG. 5A described as the top view of an open flat square paper napkin of conventional 1 ply, 2 ply, or 3 ply paper thickness, with a color pattern called the "Pineapple Design" printed or otherwise applied onto it, which is the same design as in U.S. design Pat. No. D484,317 S for "Surface Pattern for a Napkin Providing the Illusion of a Three-Dimensional Pineapple" issued Dec. 30, 2003, incorporated herein by reference.
Figure 5B:
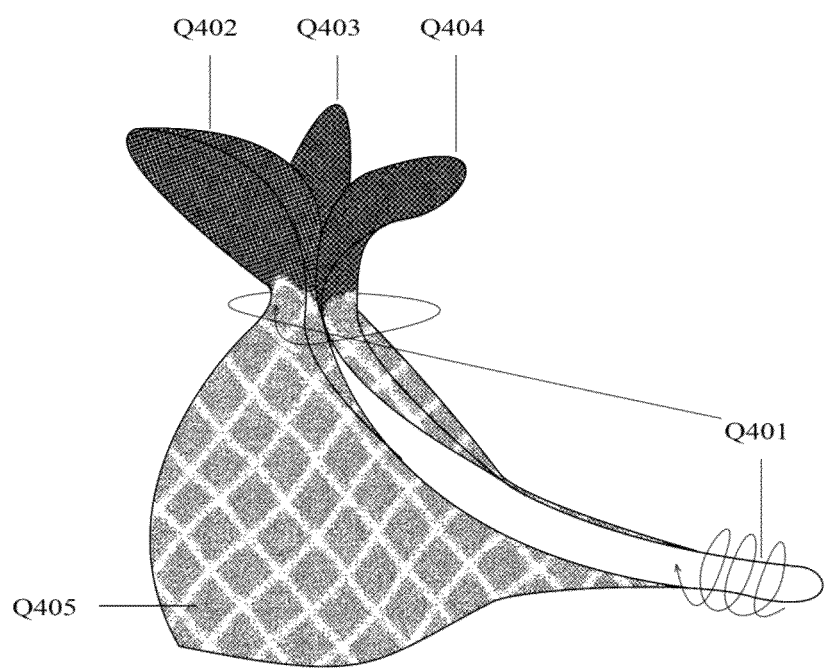
FIGS. 5Ba and 5Bb illustrate the folding steps of a well-known origami or napkin fold called the "Pineapple" origami or napkin fold.
Figure 5B:
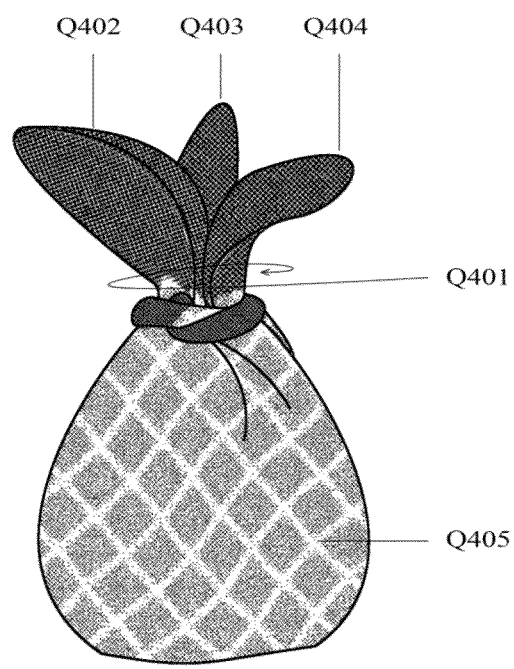

Referring to FIG. 5Bb shown is a another presently preferred embodiment of the invention that begins with the application of the "Pineapple Design" to a napkin, preferably a square white paper napkin or serviette, of conventional 1 ply, 2 ply, or 3 ply paper napkin thickness.

Referring to FIG. 5A, the "Pineapple Design" preferably has 5 different color pattern sections or quadrants, specifically Q401, Q402 Q403, Q404, and Q405. The color patterns are preferably printed or otherwise applied in some manner onto one side of the complete napkins surface. Q401, Q402, Q403 and Q404 preferably consist of the same identical colors and pattern sequence. Reference P1 represents the green variegated spinney crown at the corners of the design. Q405 is preferably colored yellow and brown, and represents the body of the pineapple denoted by P2. T1, T2, T3, and T4 refer to the corner of each quadrant.

The folding steps of a well-known "Pineapple" origami or napkin fold are generally as follows: 1. Open napkin printed side down. →2. Gently roll/twist one green tip to use as the tie off. →3. Place finger in center, pull the other 3 tips to the center. →4. Bring the twisted tip up and wrap it around the others, and tie it off at the fruit's body level. →5. Pull areas of the fruits body to widen and make full inflating the fruit, and spread the tips apart.

More specifically, FIG. 5Ba illustrates the result of the first folding steps wherein the napkin in FIG. 5A is fully open with the printed side facing down, and the unprinted white side facing up, place a finger in the center of the square napkin, and lift 3 green tips Q402, Q403, and Q404 up to meet each other touching in the center, while holding the 3 tips together, gently roll, or twist Q401, the one remaining green tip to use as the tie off fold, as shown in FIG. 5Bb.

FIG. 5Bb illustrates and contains the view of the final folding step with a line and arrow showing the motion and direction of the final tie off fold using the green tip Q401, and gives the view of the completed fold, as the directional arrow shows, bring the twisted tip Q401 up and wrapping it around the other green tips Q402, Q403, and Q404, over itself, and tucking or folding Q401 back up under itself at the top of Q405 the golden yellow body as shown in FIG. 5Ba and it holds the other tip quadrants together, completing the colored 3D paper napkin structure resembling an actual pineapple, FIG. 5Bb.

Figure 6A:
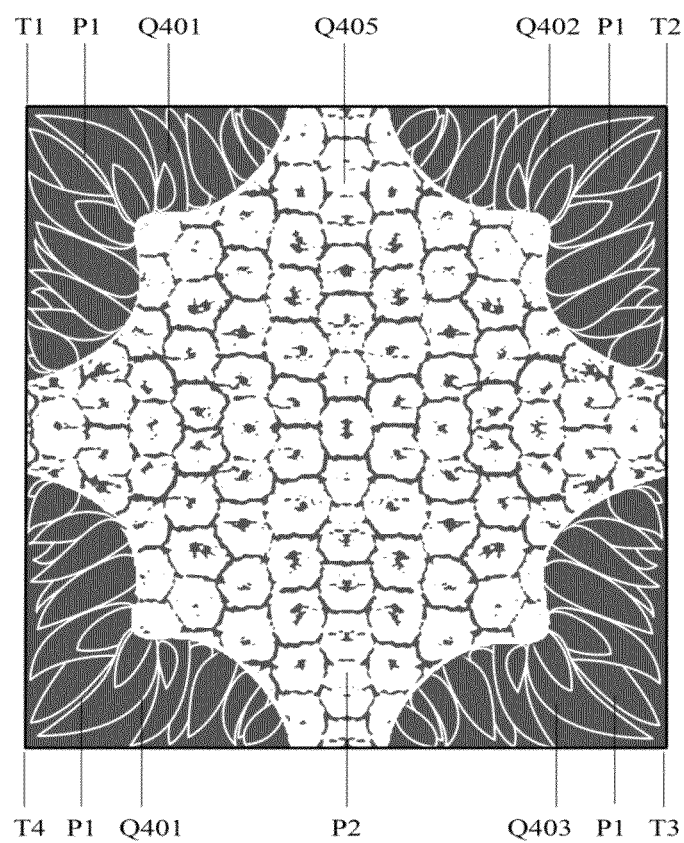
FIG. 6A described as the top view of an open flat square paper napkin of conventional 1 ply, 2 ply, or 3 ply paper thickness, with a color pattern called the "Pineapple Design 2" printed or otherwise applied onto it, which is a modification of the design in U.S. design Pat. No. D484,317 S for "Surface Pattern for a Napkin Providing the Illusion of a Three-Dimensional Pineapple" issued Dec. 30, 2003, incorporated herein by reference.
Figure 6B:
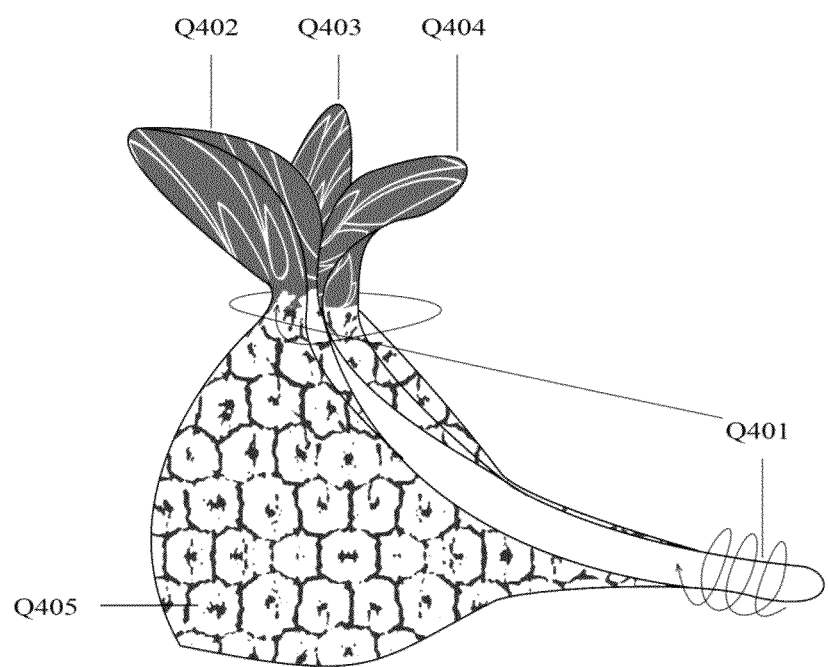
FIGS. 6Ba and 6Bb illustrate the folding steps of the well-known "Pineapple" origami or napkin fold.
Figure 6B:
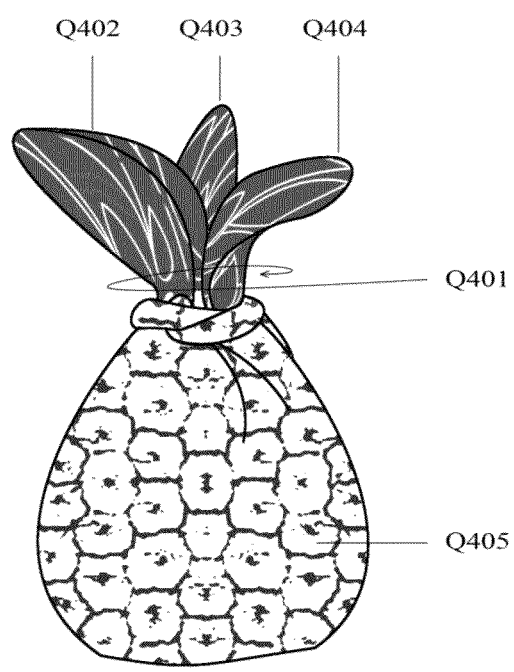

Referring to FIG. 6Bb shown is a another presently preferred embodiment of the invention that begins with the application of the "Pineapple Design 2" to a napkin, preferably a square white paper napkin or serviette, of conventional 1 ply, 2 ply, or 3 ply paper napkin thickness.

Referring to FIG. 6A, the "Pineapple Design 2" preferably has 5 different color pattern sections or quadrants, specifically Q401, Q402 Q403, Q404, and Q405. The color patterns are preferably printed or otherwise applied in some manner onto one side of the complete napkins surface. Q401, Q402, Q403 and Q404 consist of the same identical colors and pattern sequence. Reference P1 represents the green variegated spinney crown at the corners of the design. Q405 is preferably colored to golden yellow and brown, and represents the body of the pineapple which denoted by P2. T1, T2, T3, and T4 refer to the corner of each quadrant.

The folding steps of a well-known "Pineapple" origami or napkin fold are generally as follows: 1. Open napkin printed side down. →2. Gently roll/twist one green tip to use as the tie off. →3. Place finger in center, pull the other 3 tips to the center. →4. Bring the twisted tip up and wrap it around the others, and tie it off at the fruit's body level. →5. Pull areas of the fruits body to widen and make full inflating the fruit, and spread the tips apart.

More specifically, FIG. 6Ba illustrates the result of the first folding step wherein the napkin in FIG. 6A is fully open with the printed side facing down, and the unprinted white side facing up, place a finger in the center of the square napkin, and lift 3 green tips Q402, Q403, and Q404 up to meet each other touching in the center, while holding the 3 tips together, gently roll, or twist Q401, the one remaining green tip to use as the tie off fold, as shown in FIG. 6Bb.

FIG. 6Bb illustrates and contains the view of the final folding step with a line and arrow showing the motion and direction of the final tie off fold using the green tip Q401, and gives the view of the completed fold, as the directional arrow shows, bring the twisted tip Q401 up and wrapping it around the other green tips Q402, Q403, and Q404, over itself, and tucking or folding Q401 back up under itself at the top of Q405 the golden yellow body as shown in FIG. 6Ba, and it holds the other tip quadrants together, completing the colored 3D paper napkin structure resembling an actual pineapple shown in FIG. 6Bb.

The invention claimed is:

1. A colored three-dimensional object that resembles an actual recognizable object having corresponding structures created by the process comprising:
    providing a two-dimensional square white paper napkin having edges, a front side, and a back side;
    applying a color pattern having colors and designs on said front side so that said color pattern is registered with said edges to create a colored two-dimensional napkin bearing said color pattern;
    wherein said color pattern creates said colored three-dimensional object that resembles said actual recognizable object when said colors and said designs are matched onto said corresponding structures when said napkin is folded using a known napkin fold for said actual recognizable object;
    whereby when said two-dimensional napkin bearing said color pattern is folded using said known napkin fold, said colored three-dimensional object that resembles said actual recognizable object, with said colors and said designs matched on said corresponding structures, is created and can be viewed and is recognizable from more than one elevational or perspective view.

2. The object according to claim 1, wherein said applying step is performed by printing.

3. The object according to claim 2, wherein said color pattern is the Sea Shell Design, said known napkin fold for said actual recognizable object is the Sea Shell napkin fold, and said colored three-dimensional object that resembles said actual recognizable object is a sea shell.

4. The object according to claim 2, wherein said color pattern is the Bird of Paradise Flower Design, said known napkin fold for said actual recognizable object is the Bird of Paradise napkin fold, and said colored three-dimensional object that resembles said actual recognizable object is a bird of paradise flower.

5. The object according to claim 2, wherein said color pattern is the Pineapple Design, said known napkin fold for said actual recognizable object is the Pineapple napkin fold, and said colored three-dimensional object that resembles said actual recognizable object is a pineapple.

6. The object according to claim 2, wherein said color pattern is the Rainbow Design, said known napkin fold for said actual recognizable object is the Rainbow napkin fold, and said colored three-dimensional object that resembles said actual recognizable object is a rainbow.

\* \* \* \* \*